United States Patent
Heller

(10) Patent No.: US 7,239,616 B2
(45) Date of Patent: Jul. 3, 2007

(54) SIGNAL ANALYZER AND METHOD FOR DISPLAYING POWER LEVELS OF CODE CHANNELS WITH ORTHOGONAL TRANSMIT DIVERSITY

(75) Inventor: Klaus Heller, Gauting (DE)

(73) Assignee: Rohde & Schwarz GmbH & Co., KG, Munich (DE)

(*) Notice: Subject to any disclaimer, the term of this patent is extended or adjusted under 35 U.S.C. 154(b) by 379 days.

(21) Appl. No.: 10/517,296

(22) PCT Filed: Apr. 30, 2003

(86) PCT No.: PCT/EP03/04567

§ 371 (c)(1),
(2), (4) Date: Dec. 7, 2004

(87) PCT Pub. No.: WO03/107567

PCT Pub. Date: Dec. 24, 2003

(65) Prior Publication Data

US 2006/0056358 A1    Mar. 16, 2006

(30) Foreign Application Priority Data

Jun. 14, 2002  (DE) ............................... 102 26 639

(51) Int. Cl.
*H04B 1/02* (2006.01)
*H04B 7/00* (2006.01)

(52) U.S. Cl. .................. 370/310; 370/335; 370/342; 370/441; 455/101; 455/522; 702/62

(58) Field of Classification Search ................ 370/241, 370/318, 328, 335, 342, 441; 455/101, 522, 455/566, 562.1; 375/299, 347; 702/60–62
See application file for complete search history.

(56) References Cited

U.S. PATENT DOCUMENTS 6,173,005 B1    1/2001  Kotzin et al.

(Continued)

FOREIGN PATENT DOCUMENTS

DE    100 56 258 A1    5/2002

OTHER PUBLICATIONS

Rohani, Kamyar et al.; A comparison of Base Station Transmit Diversity Methods for Third generation Cellular Standards; Vehicular Technology Conference; 1999, IEEE 49th; vol. 1; pp. 351-355.

(Continued)

*Primary Examiner*—Simon Nguyen
(74) *Attorney, Agent, or Firm*—Ditthavong Mori & Steiner, P.C.

(57) ABSTRACT

A signal analyzer and a method for displaying power levels of code channels of a CMDA signal sent with orthogonal transmit diversity (OTD) via at least one of at least two antennae is described. Once a code class has been determined for representing the power of each individual code channel, the power levels of the code channels in the next highest code class are defined and associated with a respective antenna. Once a code channel exchange has been carried out according to the actual association of the antennae in relation to the code class of the actually active code channels, the power levels of the code channels for at least one antenna are correctly represented on a display device in terms of the antenna.

5 Claims, 5 Drawing Sheets

U.S. PATENT DOCUMENTS

| | | |
|---|---|---|
| 6,219,340 B1 * | 4/2001 | Cutler et al. ................. 370/241 |
| 6,519,227 B1 * | 2/2003 | Koizumi ..................... 370/241 |
| 6,850,238 B2 * | 2/2005 | Bryant et al. ............ 345/440.1 |
| 6,879,576 B1 * | 4/2005 | Agrawal et al. ............ 370/342 |
| 2002/0085522 A1 | 7/2002 | Huber |
| 2003/0002454 A1 * | 1/2003 | Lee et al. ................... 370/328 |
| 2003/0016640 A1 * | 1/2003 | Onggosanusi et al. ...... 370/335 |
| 2003/0063586 A1 * | 4/2003 | Engholm et al. ........... 370/335 |
| 2003/0224798 A1 * | 12/2003 | Willenegger et al. ....... 455/450 |

OTHER PUBLICATIONS

Wang, K et al.; New Differential Transmission Scheme with Transit Diversity for DC-CDMA Systems; Vehicular Technology Conference; 2001, IEEE 54th; vol. 1 of 4; pp. 232-236.

* cited by examiner

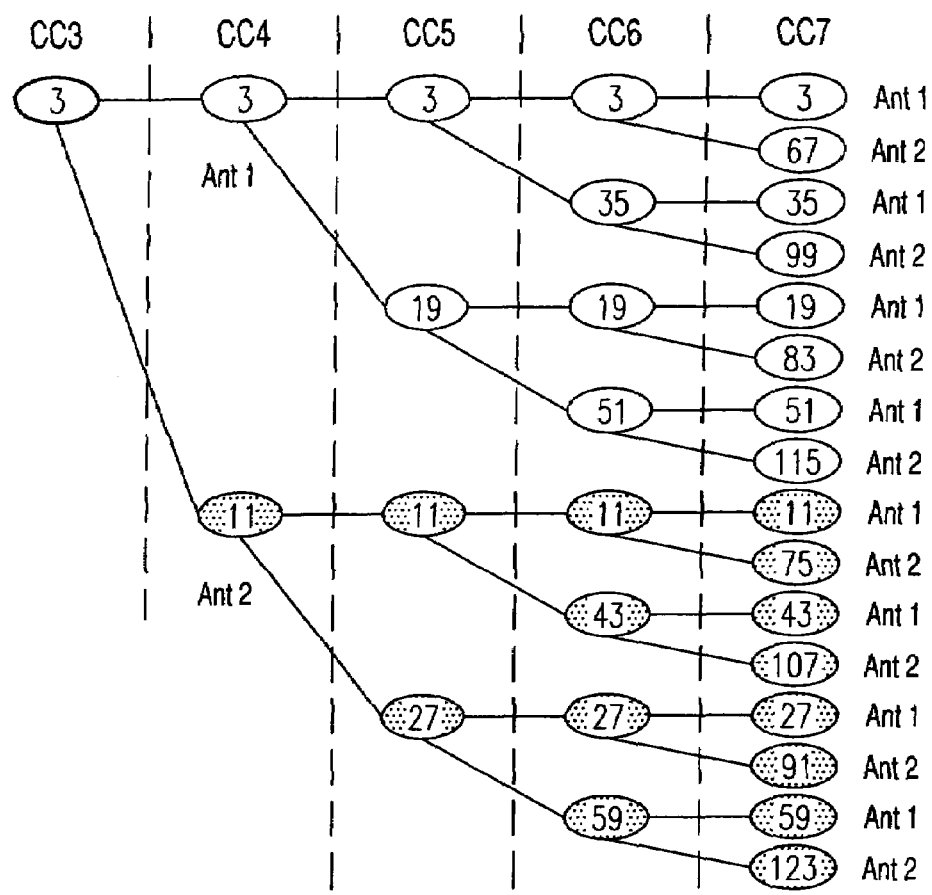
Fig. 5A
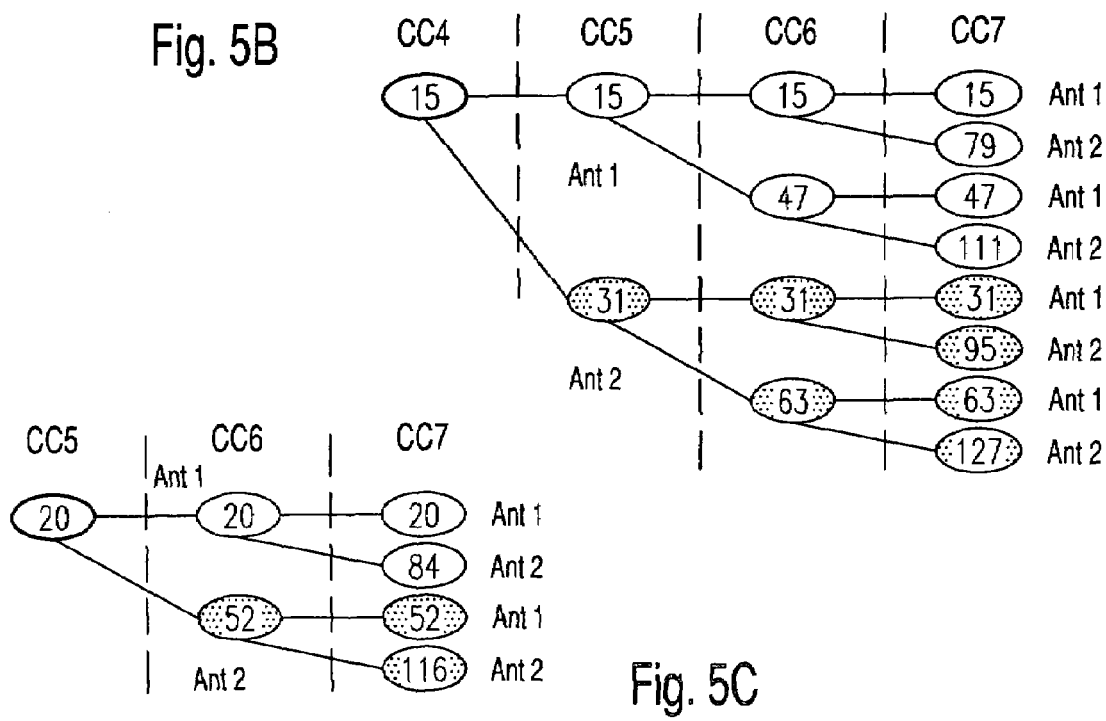
Fig. 5B
Fig. 5C

SIGNAL ANALYZER AND METHOD FOR DISPLAYING POWER LEVELS OF CODE CHANNELS WITH ORTHOGONAL TRANSMIT DIVERSITY

FIELD OF THE INVENTION

The invention relates to a signal analyzer and also to a method for displaying power levels of code channels of a CDMA (Code Division Multiple Access) signal.

BACKGROUND OF THE INVENTION

In order to check components for third-generation mobile radio systems, it is necessary to determine power levels of individual code channels of which the whole signal is composed. In order to implement an evaluation of the measured power levels of the individual code channels, the respective power levels of the code channels are represented graphically.

For this purpose, it is known from U.S. Pat. No. 6,219,340 B1 to represent the individual power levels of the code channels in the form of a bar. The individual code channels are plotted in the direction of the X axis such that the code channels associated respectively with one code class are disposed situated one next to the other. The length of the bars represented for each code channel in the Y direction thereby indicates the measured power level of the respective code channel. The association of the individual code channels with one code class, i.e. with a specific spreading factor (SF), is achieved in the proposed representation in that, corresponding to the lower spreading factor of the lower code class, the representation of the assigned bars for the respectively corresponding code channel of the lower code class is wider.

In the evaluation of signals with orthogonal transmit diversity, the problem exists that the power levels of the individual code channels and their distribution to the antennae used are thus not detectable. In particular, it is not provided to represent those code channels, which are associated with an active antenna of an actually active code channel, en masse.

The disadvantage is produced therefrom that, for an antenna with orthogonal transmit diversity (transmission via a plurality of antennae with a code which is orthogonal for the antennae), only a part of the power levels of code channels which are actually relevant for an active code channel is represented.

SUMMARY OF THE INVENTION

There exists a need to produce a signal analyzer and also a method for displaying power levels of code channels, in which, for CDMA signals with transmit diversity, the power levels of the code channels to be represented for respectively one antenna are represented completely.

With orthogonal transmit diversity, the signal of an active code channel is distributed to at least two antennae. For this purpose, two orthogonal codes are generated which can be taken from the next higher code class. The lower code channel number is then assigned to antenna 1, the higher code channel number to antenna 2.

Because of generating the individual codes of the code channels for the respective code classes and because of the specification for transmit diversity that the respectively lower code channels, i.e. those code channels with the lower code channel numbers, must be assigned to a first antenna or respectively the upper code channels to a second antenna when a signal is transmitted with transmit diversity, only every second measured code channel is assigned to the code branch of the actually active antenna in the representation of an active code channel in a higher code class. This misleading assignment is corrected by the method according to the invention or respectively in an evaluation device of the signal analyzer according to the invention corresponding to the production of the code channels from the Hadamard matrix. Hence in the corrected representation, the power levels of all code channels associated respectively with an actually active antenna are displayed.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The invention is represented in the drawing and is explained in more detail by means of the subsequent description with reference to embodiments. There are shown:

FIG. 5A-C three further schematic representations of sections of a code tree;

In FIG. 1 a section of a code tree is represented schematically. The individual code classes are plotted in the horizontal direction, which code classes are designated with the references CC5 for code class 5, CC6 for code class 6 etc. In the represented example, the code channel with the number 19 of the code class CC5 is intended to be active. Upon transmission of the signal with orthogonal transmit diversity, the code assigned to the code channel 19 of the code class CC5 is spread by an additional factor for distribution to the two antennae Ant1 and Ant2. The channel 19, which is actually active in code class CC5 is therefore transmitted in the code class CC6 as code channel 19 to antenna Ant1 and as code channel 51 to antenna Ant2.

The law for forming code channel numbers is as follows: the code channel number for antenna Ant1 is the base code channel number. The code channel number for antenna Ant2 is the base code channel number plus the base spreading factor.

It may be assumed in the present example that a representation of the power levels of the code channels in code class CC7 is intended to be effected. For this purpose, it is firstly required to take into account the additional spreading factor on the basis of the orthogonal transmit diversity, the next higher code class CC8 being measured before the representation of the code class CC7. In accordance with the specification for generating the codes and assigning the code channels to the individual antennae with the orthogonal transmit diversity, the individual code channels, as represented in FIG. 1, are distributed to the antenna Ant1 or respectively antenna Ant2.

This means that measurement of the power levels of the individual code channels is produced in the code class CC8, that the power levels of the code channels 19, 83, 51 and 115 are measured for the antenna Ant1 and, for the antenna Ant2, the code channels 147, 211, 179 and 243. This assignment is produced from the specification that respectively the lower half of the channel numbers must be assigned to the antenna Ant1 and the upper half of the channel numbers to the antenna Ant2.

Figure 1:
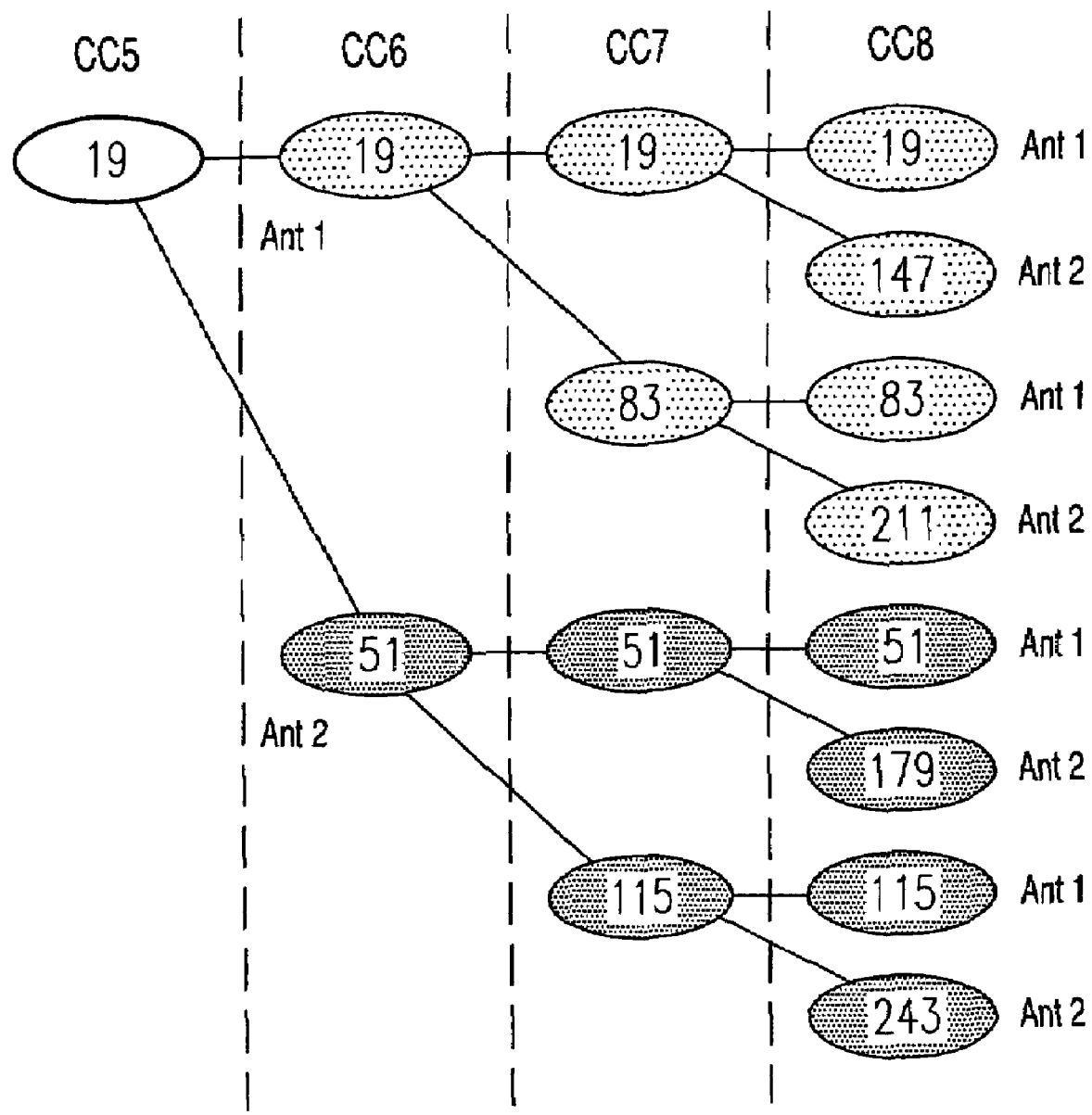
FIG. 1 a schematic representation of a section of a code tree.

For the chosen example, the antenna Ant1 with the code channel 19 in code class CC5 is however actually active so that the code channels 19, 147, 83 and 211 must be assigned to the antenna Ant1 for correct antenna-wise reproduction of the measured power levels, as is produced from the representation of the corresponding code branch in FIG. 1 which corresponds to a "bit-reverse representation". Therefore, a correct antenna-wise representation comprises for antenna Ant2 the code channels 51, 179, 115 and 243 which are produced from the code branch which has its origin in code class CC6 in the code channel 51.

Figure 2:
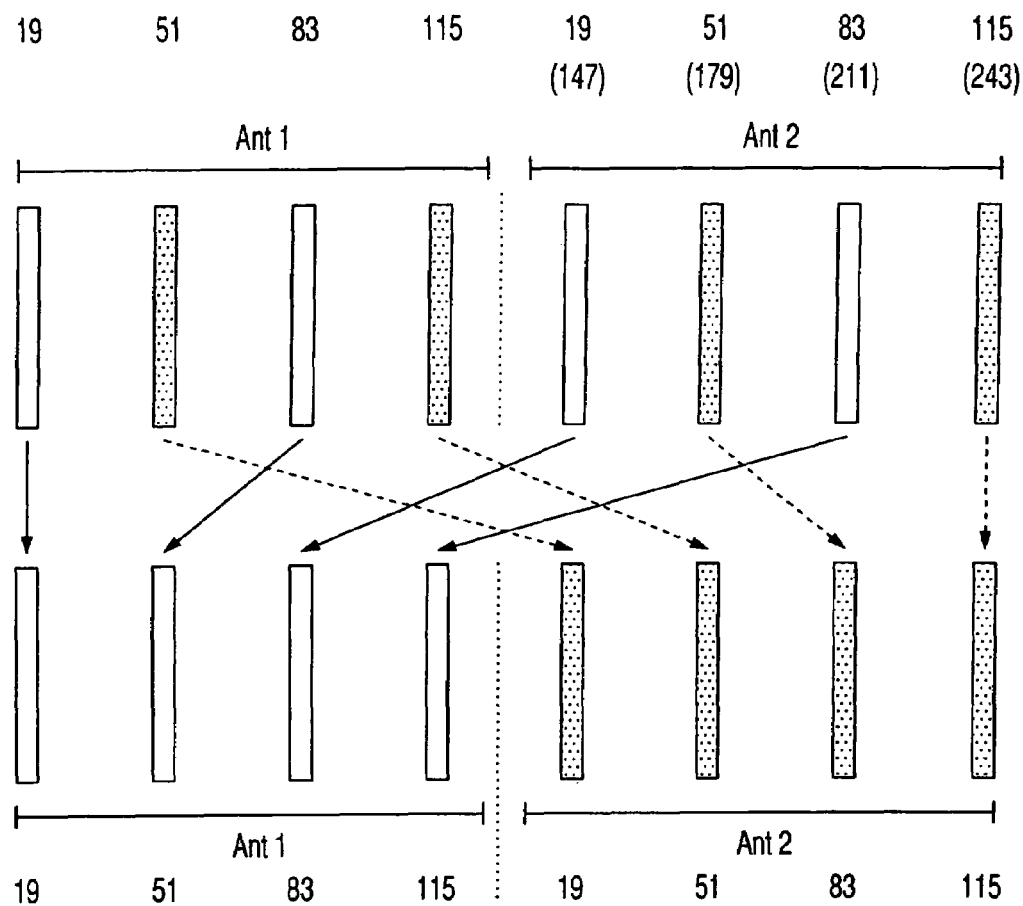
FIG. 2 an overview of the assignment for the example from FIG. 1.

In FIG. 2, the assignment for the chosen example from FIG. 1 is represented schematically. In the upper half of FIG. 2, the power levels of the code channels are represented just as they are produced directly from the measurement in code class CC8. This leads to the fact that the code channels with the numbers 19, 51, 83 and 115 which are present in code class CC7 are represented respectively once for antenna Ant1 and are represented once for antenna Ant2 because of the orthogonal transmit diversity. For antenna Ant2, in addition the code channel number, as is represented in code class CC8 of FIG. 1, is plotted for better comprehension.

As was cited already with respect to FIG. 1, a correctly assigned representation of the antenna Ant1 in code class CC7 would have to comprise those code channels which were generated from the code channel 19 of the code class CC6 corresponding to the code branch. In the upper half of FIG. 2, these code channels are represented by the bars which are not filled in.

In order now to enforce a correct antenna-wise assignment of the code channels, the code channels associated respectively with the antenna Ant1, as is represented by the arrows in FIG. 2, are assigned according to the invention actually to the antenna Ant1. The code channels represented in grey in the upper half of FIG. 2, which code channels should actually be assigned to the antenna Ant2, are represented correctly according to the invention correspondingly in the lower half on the right in the case of antenna Ant2.

In order that no power level values of the code channels are overwritten in the implementation of the correct assignments, prior to the implementation of the representation of the individual code channels with respect to their respectively actually active antenna, a copy of the measurement result is produced. Hence all the power levels of the code channels are maintained with their correct value.

The representation with respect to the actual active antenna of an active channel is of particular advantage when transmission does not take place via both antennae but only one of the two antennae is active. As can be detected directly from the upper half of the representation in FIG. 2, without the implementation of the correct assignment, both the antenna Ant1 and the antenna Ant2 would have channels with power. After implementation of the code channel exchange, there is displayed for an actually active antenna Ant1 in the lower half only power for code channels which are actually assigned to the antenna Ant1, whereas no power would be displayed for the code channels of the antenna Ant2 which are represented in grey.

Figure 3:
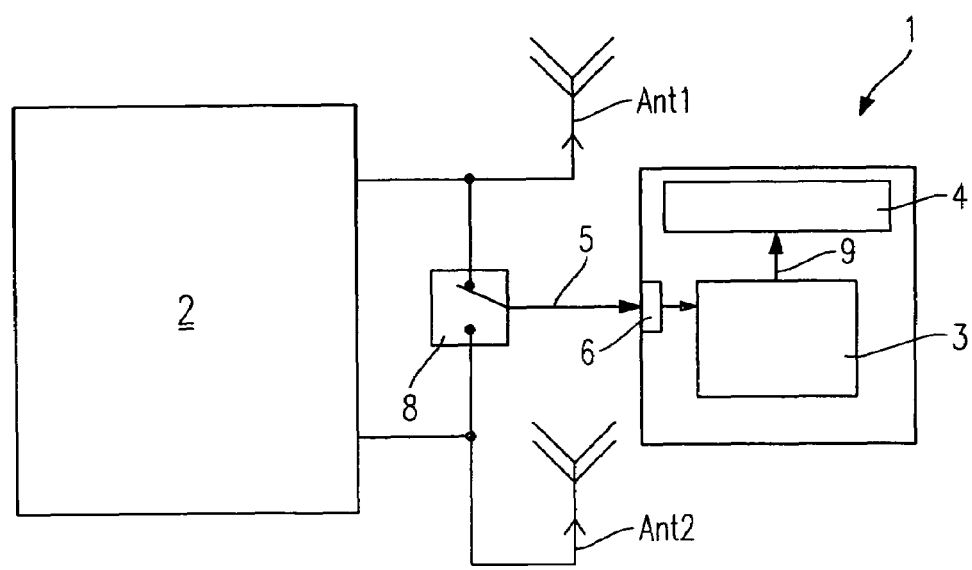
FIG. 3 a block diagram of a measuring system, given by way of example, with the signal analyzer according to the invention.

A block diagram is represented in FIG. 3, which shows a signal analyzer 1 according to the invention, by means of which for example the signal of a base station 2 is intended to be analysed. The signal analyzer 1 comprises an evaluation device 3 and a display device 4. A CDMA signal 5 is supplied via an input connection 6 to the signal analyzer 1. In the represented embodiment, the CDMA signal 5 is received via a change-over switch 8 which is connected to the signal analyzer 1. Instead of the direct connection line, via which the signal 5 is transmitted, also an antenna could be connected to the input connection 6 which receives the CDMA signal 5 beamed from the base station 2 via the antennae Ant1, Ant2, or a combiner, which generates the total signal of antenna Ant1 and antenna Ant2.

After the CDMA signal 5 of only one of the two antennae Ant1 or Ant2 is received by the signal analyzer 1, the power level for the code channels of that code class which is the next higher code class to the one to be represented, is determined in the evaluation device 3, which code class is established for example by an operator. In the above-described example, that would be the code class CC8 for the code class CC7 to be represented. Subsequently, a representation of the measured powers of the code channels is generated in the evaluation device 3, finally the code channels, which must be assigned to the corresponding antenna Ant1 or respectively antenna Ant2, being determined from this representation.

The thus determined powers of the code channels for the antenna Ant1 or respectively for the antenna Ant2 are subsequently supplied via a connection 9 to the display device 4. On the display device 4, a bar diagram is then preferably represented which contains the power levels of the code channels for the code class to be represented, in the present case the code class CC7, the display device 4 preferably representing respectively only antenna Ant1 or antenna Ant2.

Figure 4:
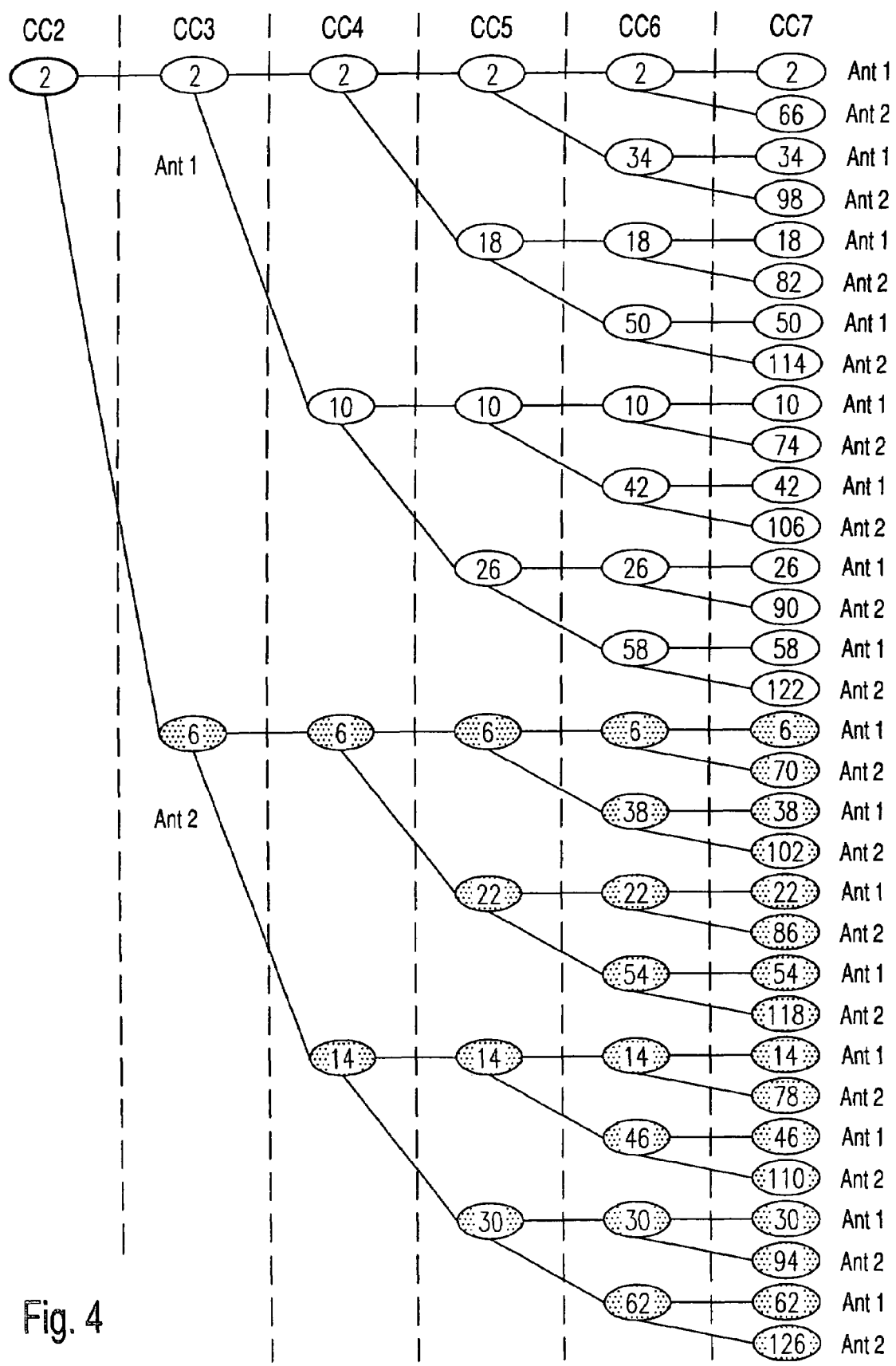
FIG. 4 a further schematic representation of a section of a code tree.

In FIG. 4, the resultant code tree for an active code channel 2 of the code class 2 is represented. Because of the orthogonal transmit diversity, the active code channel 2 of the code class CC2 is transmitted via an antenna Ant1 and an antenna Ant2, the antenna Ant1 containing the code channel 2 of the code class CC3 and the antenna 2 the code channel 6 of the code class CC3. In a representation of the measured power level of the individual code channels, there should therefore be displayed, for the antenna Ant1, respectively that power level of the code channels which emanate from the code channel 2 of the code class CC3. In FIG. 4, this is the entire upper half of the represented code tree. If a representation of the code class CC6 is chosen, the code channels 2, 66, 34 etc. up to 122 would therefore have to be correspondingly represented in a correct antenna-wise representation with respect to the antenna Ant1, as this corresponds to the upper half of the code channels represented with respect to code class CC7.

For representation of the power levels of the code channels in code class CC6, the power level of the individual code channels in the code class CC7 must be measured with orthogonal transmit diversity, as has been described above already. Because of the assignment of the individual code channel numbers to antenna Ant1 or respectively Ant2, it is thereby revealed that only every second code channel number of the code class CC7 is assigned to the antenna Ant1.

Figure 6:
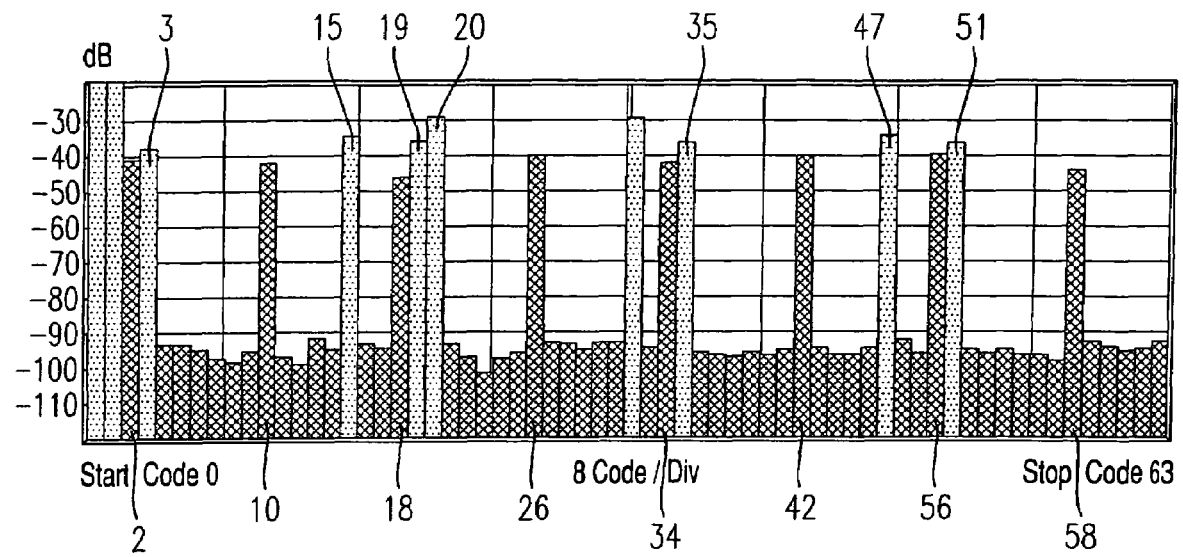
FIG. 6 a graphic representation of the display device before implementation of the code channel exchange.

For representation of the power level on the display device 4, the channels are sorted according to the invention such that increasing code channel numbers are disposed on the X axis. In code class CC7, the channel numbers 0 to 127 exist, the code channel numbers 0 to 63 being assigned to the antenna Ant1 and the code channel numbers 64 to 127 to antenna Ant2. The representation resulting therefrom on the display device 4 of the signal analyzer 1 is represented in FIG. 6, it being assumed that respectively only noise power level is measurable for the antenna Ant2. Without implementation of the code channel exchange according to the invention, a power level of an active code channel is therefore measurable only for the code channels 2, 10, 18, 26, 34, 42, 50 and 58 which are represented in a dark colour in FIG. 6.

It is revealed in contrast from the code branch of the antenna Ant1 of FIG. 4 that power levels, which are measurable in the code channels 66, 74, 82, 90 etc., should likewise be assigned to the antenna Ant1.

Figure 7:
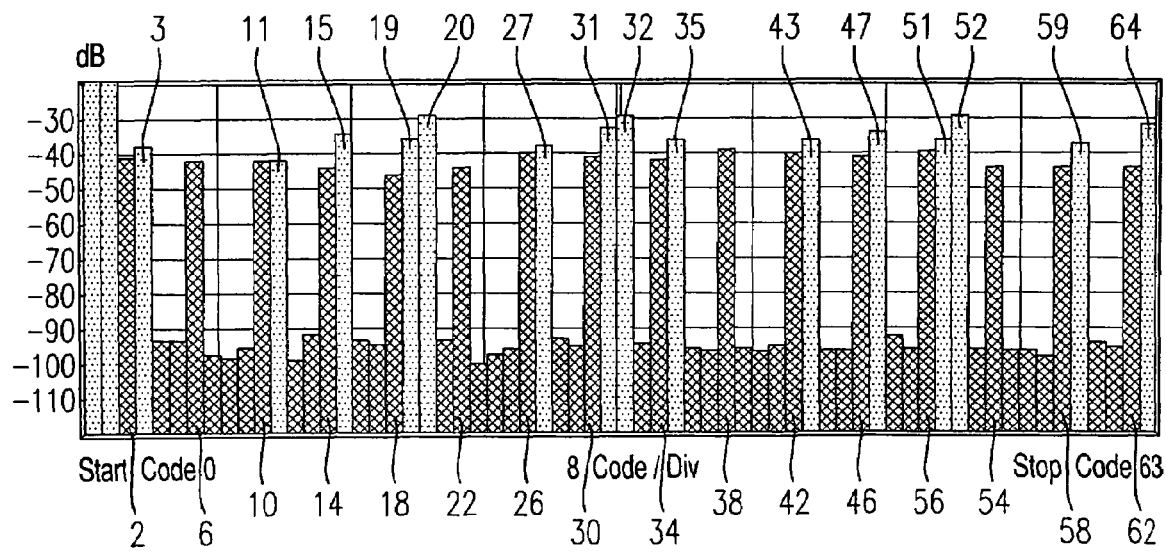
FIG. 7 a graphic representation of the power levels of the code channels after implementation of the code channel exchange.

After implementation of the code channel exchange according to the invention, the image represented in FIG. 7 is produced on the display device 4, the code channels 66, 74, 82 etc. assigned originally to the antenna Ant2 having now been represented in the region of the lower code channel numbers and hence being correctly represented antenna-wise for the antenna Ant1. In FIG. 7, power levels for the code channels 2, 6, 10, 14, 18, 22, 26 etc. can therefore be detected.

In FIGS. 5A, 5B and 5C, further sections of code trees for the active code channel 3 of the code class CC3, the active code channel 15 of the code class CC4 and the active code channel 20 of the code class CC5 are represented. The power levels measured respectively in the code class CC7 for antenna Ant1 are, corresponding to the example from FIG. 4 explained above in detail, likewise represented in FIG. 6. For better differentiation, the thus represented code channels 3, 15, 19, 20 etc. are represented in light grey.

In contrast, FIG. 7 shows in turn a correct antenna-wise representation of all the power levels in the code channels measured with respect to one antenna Ant1. For the sake of a more comprehensible representation, it was assumed in the representation of FIG. 6 that the antenna Ant2 respectively is inactive. In practice however, generally also antenna Ant2 will contribute to the data transmission. In order that the power level of the antenna Ant2 occurring in the respective code channels is not overwritten by the power levels of the antenna Ant1 in the code channel exchange, a corresponding storage of the power levels coming from antenna Ant2 is required in advance. Such a storage can be achieved for example by copying the power levels of the individual code channels, before implementation of the code exchange, into a memory.

The invention claimed is:

1. A method for displaying power levels of code channels of a CDMA (Code Division Multiple Access) signal, which is transmitted with orthogonal transmit diversity (OTD), the signal being transmitted via at last one of at least two antennae, having the following method steps:
   receiving the CDMA signal
   determining a code class for the representation of the power level of the individual code channels;
   determining the power levels of the individual code channels in the next higher code class with respect to the determined code class;
   assigning the powers of the individual code channels to the respective antenna corresponding to the orthogonal transmit diversity in the determined code class;
   implementing a code channel exchange corresponding to the actual assignment of the antennae with respect to the code classes of the actually active code channels; and
   displaying the power levels of the exchanged code channels for at least one antenna.

2. A method according to claim 1, wherein:
   displaying the power levels of the actually active code channels in conjunction with the power levels of the code branches associated with the respective active code channels.

3. A signal analyzer for analyzing CDMA signals with orthogonal transmit diversity for at least two antennae, the CDMA signal being transmitted via at least one of at least two antennae, comprising:
   an evaluation device configured for detecting the power levels of respective code channels and assigning the code channels, which are detected with respect to a corresponding code class to be represented in the next higher code class and distributed corresponding to the orthogonal transmit diversity to the respective antennae, respectively to said respective antennae which is actually active on the basis of the orthogonal transmit diversity with respect to the active code channel, and
   a display device configured for displaying the power levels of the code channels assigned to the antennae by the evaluation device.

4. A signal analyzer according to claim 3, wherein the display device represents the powers of the code channels for respectively only one actually active antenna.

5. A signal analyzer according to claim 3, wherein the display device represents the powers of active code channels as a sum of the powers of the individual code branches.

* * * * *